(12) United States Patent  (10) Patent No.: US 6,425,619 B2
Ney  (45) Date of Patent: Jul. 30, 2002

(54) VEHICLE SEAT ASSEMBLY

(75) Inventor: Clyde W Ney, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/738,528

(22) Filed: Dec. 15, 2000

Related U.S. Application Data

(60) Provisional application No. 60/175,076, filed on Jan. 7, 2000.

(51) Int. Cl.$^7$ ................................................. B60N 2/02
(52) U.S. Cl. .................. 296/65.15; 296/37.8; 296/68.1; 296/64; 297/330
(58) Field of Search ............................. 296/65.15, 64, 296/65.13, 65.14, 65.8, 65.1, 37.16, 37.8; 297/232, 233, 257, 112, 238, 344.1, 286

(56) References Cited

U.S. PATENT DOCUMENTS

| | | | | |
|---|---|---|---|---|
| 5,004,967 A | * | 4/1991 | Ogasawara | 297/330 |
| 5,038,086 A | | 8/1991 | Ahmed et al. | 318/286 |
| 5,140,235 A | * | 8/1992 | Ahmed et al. | 318/286 |
| 5,338,081 A | * | 8/1994 | Young et al. | 296/37.14 |
| 5,472,260 A | | 12/1995 | Czapski et al. | 297/112 |
| 5,476,305 A | | 12/1995 | Corkins et al. | 297/238 |
| 5,529,376 A | | 6/1996 | Jovan et al. | 297/257 |
| 5,611,589 A | * | 3/1997 | Fujii et al. | 296/64 |
| 5,671,964 A | | 9/1997 | DeRees et al. | 296/65.1 |
| 5,683,140 A | | 11/1997 | Roth et al. | 297/344.1 |
| 5,704,684 A | | 1/1998 | Dukata et al. | 297/238 |
| 5,720,514 A | * | 2/1998 | Carlsen et al. | 297/188.1 |
| 5,947,541 A | * | 9/1999 | Behrens et al. | 296/64 |
| 5,950,978 A | * | 9/1999 | Eguchi et al. | 297/344.1 |
| 5,951,084 A | * | 9/1999 | Okazaki et al. | 296/37.16 |
| 6,129,404 A | * | 10/2000 | Mattarella et al. | 296/64 |
| 6,135,529 A | * | 10/2000 | De Angelis et al. | 296/37.8 |
| 6,195,603 B1 | * | 2/2001 | Gauger et al. | 296/68.1 |
| 6,203,088 B1 | * | 3/2001 | Fernandez et al. | 296/37.8 |
| 6,264,261 B1 | * | 7/2001 | Krafcik | 296/37.8 |

* cited by examiner

Primary Examiner—Ken Patel
(74) Attorney, Agent, or Firm—Ralph E. Smith; Thomas A. Jurecko

(57) ABSTRACT

A vehicle seat assembly for a motor vehicle having a passenger compartment with a floor. The motor vehicle has a front row of seats and a rear row of seats. The front row of seats is disposed in a forward portion of the passenger compartment and is interconnected to the floor. The rear row of seats is disposed in a rear portion of the passenger compartment, behind the front row of seats, and is interconnected to the floor. The rear row of seats includes the vehicle seat assembly and has at least a portion linearly translatable in a fore direction and an aft direction under a source of power. A switch assembly is located in the forward portion of the passenger compartment for selectively controlling linear translation of the portion of the seat assembly in the fore and aft directions.

10 Claims, 5 Drawing Sheets

VEHICLE SEAT ASSEMBLY

CROSS REFERENCE TO PROVISIONAL APPLICATION

This patent application relates to U.S. Ser. No. 60/175,076, filed Jan. 7, 2000.

BACKGROUND OF THE INVENTION

1. Field of the Invention

The present invention generally pertains to motor vehicles. More particularly, the present invention pertains to a vehicle seat assembly. More specifically, but without restriction to the particular embodiment and/or use which is shown and described for purposes of illustration, the present invention relates to a rear seat assembly for a motor vehicle including a portion longitudinally translatable under a source of power.

2. Discussion

Within a motor vehicle including multiple rows of seats, it is often desirable to transport people or cargo in various configurations. In particular, small children and infants are often transported in a center, rear seat position, because the center, rear seat position is frequently recommended based on safety considerations. In general, to accommodate different configurations for transporting people or cargo, vehicle seats are often translatable in the fore-aft direction of the vehicle. Middle and rear rows of seats, however, typically do not provide for the translation of the center seat portion independent of adjacent seats. In order to address situations where this is desirable, various designs have been proposed.

For example, U.S. Pat. No. 6,135,529 discloses a center console, rather than a seat, that is adapted to store various items and is translatable between the center position of the rear row of seats and the center position of the front row of seats. The center console disclosed, however, is not adapted to retain a child or a child seat, and fully translates into the front portion of the vehicle, which is more dangerous for children because of airbags and other safety considerations.

U.S. Pat. No. 5,951,084 discloses a center seat that is fore-aft slidable between the front row and a rear row of seats. The center seat is adapted to transport a person and includes a console box adapted to retain beverages or other items. The center seat disclosed, however, fully translates into the more dangerous front row of the vehicle, which does not comport with safety considerations for children.

U.S. Pat. No. 5,611,589 discloses a vehicle having three rows of seats, and a center seat slidably mounted on a rail extending between the center portion of the middle and rear row of seats. The center seat is adapted to provide a variety of seat arrangements by translating into the middle or rear row of seats. The center seat, however, does not translate forward of the middle row of seats to provide occupants in the front row improved access to a child or items retained in the center seat.

Location of a small child or infant in a standard center seat position, or one that does not translate forward of the middle or rear row of seats, renders access to the child by adults in a front row seat difficult if not impossible. Access is further complicated where the small child or infant is being transported in a rearwardly facing child seat. In order to generally improve access by those in the front row seat of a vehicle and to provide variable seat arrangements within a vehicle, various seat structures and designs have been developed.

SUMMARY OF THE INVENTION

It is a general object of the present invention to provide a rear seat assembly for a motor vehicle including a portion translatable under a source of power in a fore direction and an aft direction.

In one form, the present invention provides a motor vehicle including a passenger compartment having a floor. The motor vehicle has a front row of seats and a rear row of seats. The front row of seats is disposed in a forward portion of the passenger compartment and is interconnected to the floor. The rear row of seats is disposed in a rear portion of the passenger compartment, behind the front row of seats, and is interconnected to the floor. The rear row of seats includes a seat assembly having at least a portion linearly translatable in a fore direction and an aft direction under a source of power. In an alternative aspect of the invention, the portion translatable includes an integrated child safety seat. A switch assembly is located in the forward portion of the passenger compartment for selectively controlling linear translation of the portion of the seat assembly in the fore and aft directions.

In another form, the present invention provides a motor vehicle seat assembly kit. The kit includes a seat assembly having at least a portion linearly translatable in a fore direction and an aft direction under a source of power. A switch assembly is adapted to be located in the forward portion of the passenger compartment for selectively controlling linear translation of the portion of the seat assembly in the fore and aft directions.

In yet another form, the present invention provides a motor vehicle seat having a selectively translatable child safety seat attached thereto. The child safety seat includes a seat portion linearly translatable in a fore direction and an aft direction under a source of power. A switch assembly is also located in the forward portion of the passenger compartment for selectively controlling linear translation of the seat portion of the child safety seat in the fore and aft directions.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENTS

Figure 1:
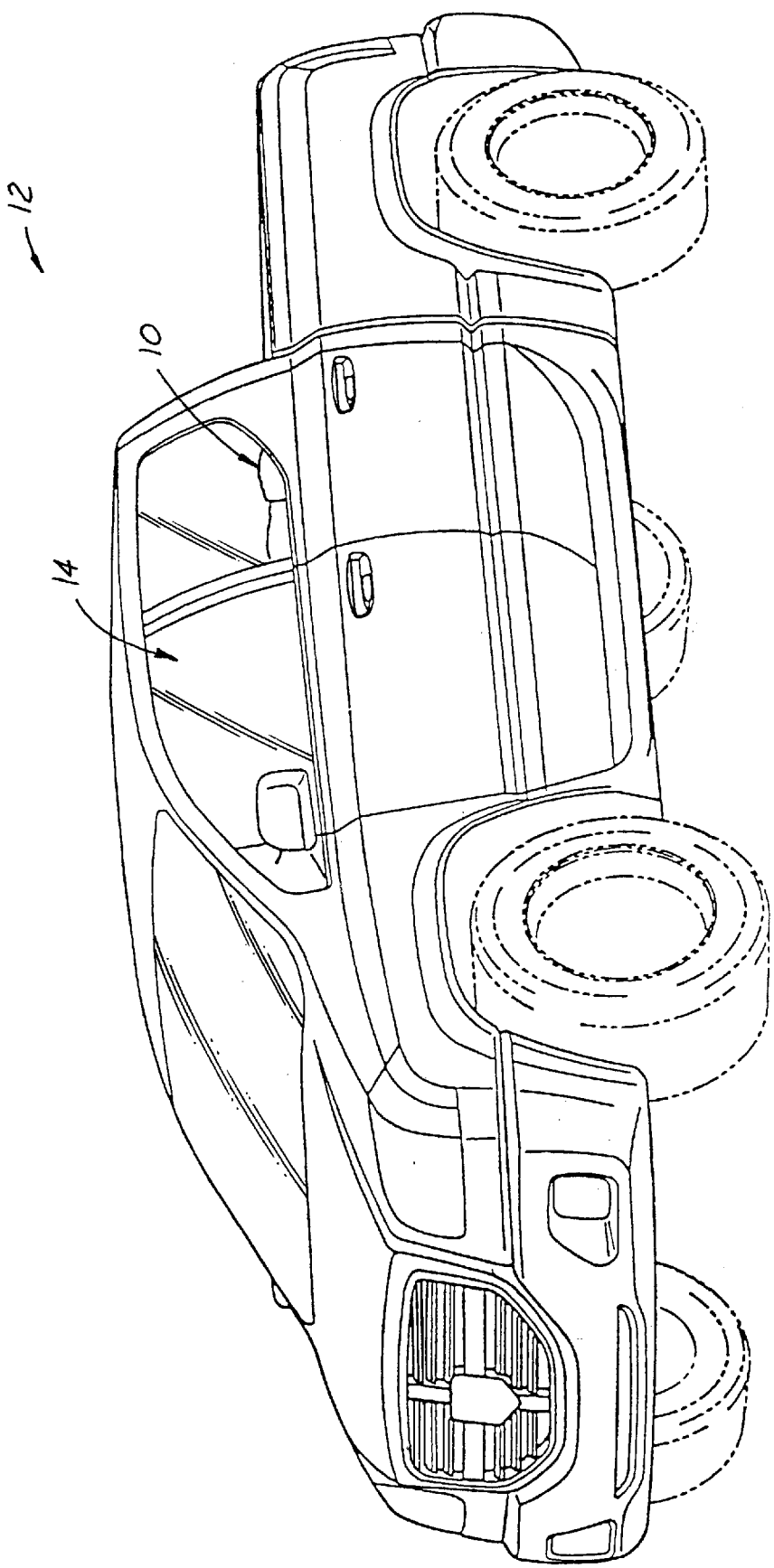
FIG. 1 is a perspective view of a motor vehicle incorporating a vehicle seat assembly constructed in accordance with the teachings of a first preferred embodiment of the present invention.
Figure 2A:
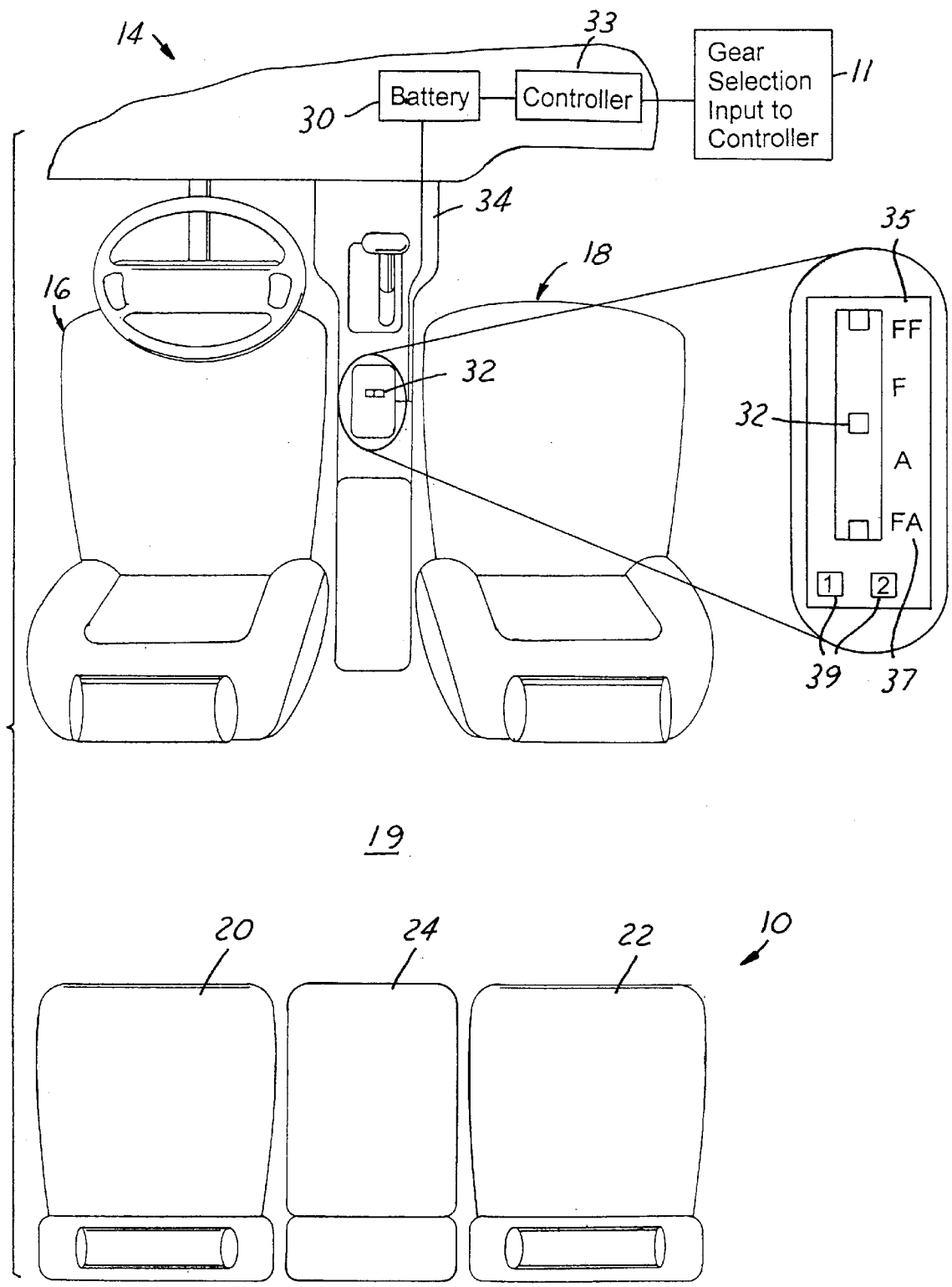
FIG. 2A is a top view of a portion of the passenger compartment of the motor vehicle of FIG. 1, illustrated with a central portion of the vehicle seat assembly of the present invention translated to an aft position.
Figure 2B:
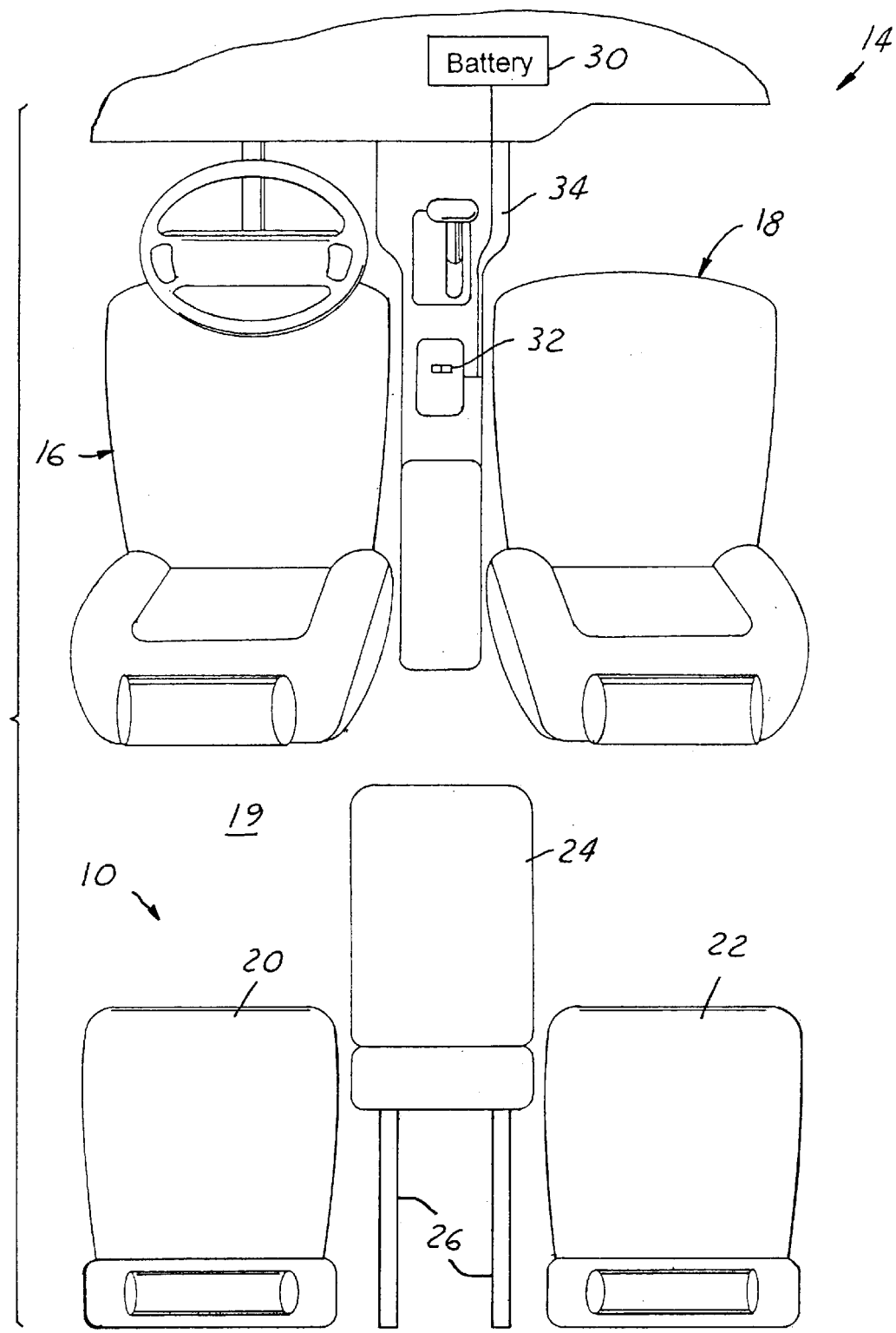
FIG. 2B is a top view similar to FIG. 2A, illustrated with the central portion of the vehicle seat assembly of the present invention translated to a fore position.
Figure 3:
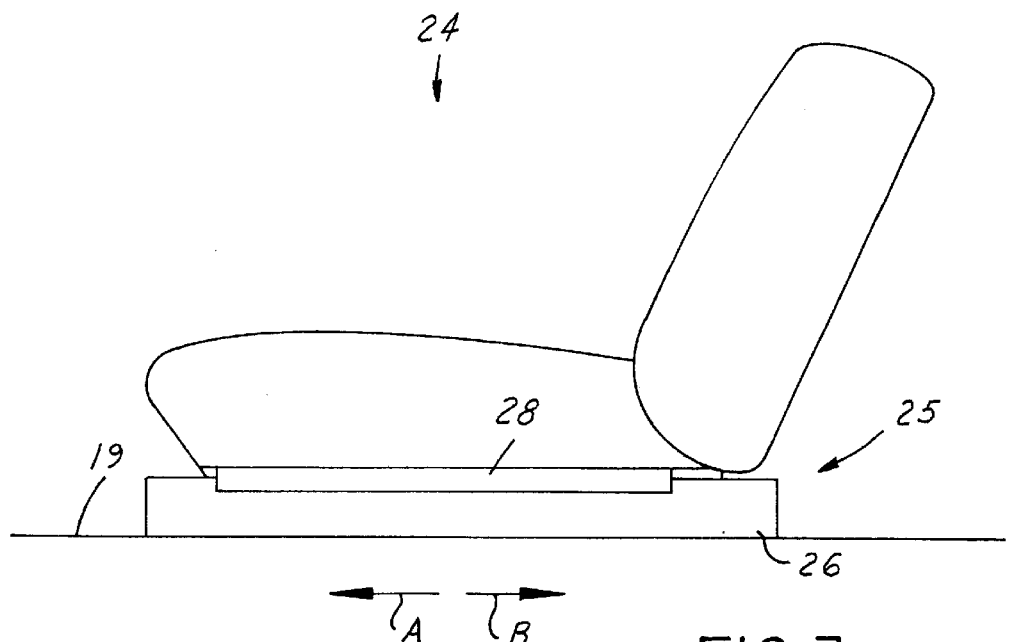
FIG. 3 is a side view of a central portion of the vehicle seat assembly of the present invention.

Referring generally to FIGS. 1 through 3, a seat assembly constructed in accordance with the teachings of a first preferred embodiment of the present invention is generally identified at reference numeral 10. The seat assembly is illustrated in the exemplary embodiment as a rear seat unit 10. The seat assembly 10 is shown incorporated into an exemplary motor vehicle 12. In one application, the exemplary motor vehicle is a pick-up truck 12. However, it will become understood by those skilled in the art that the teachings of the present invention are applicable to various other motor vehicles incorporating multiple rows of passenger seats.

The motor vehicle 12 is shown to include a passenger compartment 14 having first and second rows of vehicle seats. The first row includes a driver's seat 16 and a passenger's seat 18 positioned in a forward portion of the passenger compartment 14. The second row of vehicle seats is located in a rearward portion of the passenger compartment and is provided by the seat assembly 10 of the present invention. In the embodiment illustrated, the driver's and passenger's seats 16 and 18 are conventional bucket seats which are conventionally interconnected to a floor 19 of the motor vehicle. The driver's and passenger's seats 16 and 18 need not be further described.

The seat assembly 10 of the present invention is illustrated as a three-across vehicle seat or split bench seat assembly 10 considered to be particularly suitable for vehicles such as extended cab pick-up trucks, minivans and the like. The seat assembly 10 is one complete unit having first and second outboard seat segments or portions 20 and 22 and a central seat segment or portion 24 therebetween.

The first and second outboard seat segments 20 and 22 are interconnected to the floor 19 of the motor vehicle 12. The particular manner of connection is beyond the scope of the present invention. One suitable manner is shown and described in commonly assigned U.S. Pat. No. 5,529,376 which is hereby incorporated by reference as if fully set forth herein.

The central seat segment 24 is mounted to the floor 19 through a power slide mechanism 25 for selective movement in both a fore direction A and an aft direction B. The central seat segment 24 is slidably mounted on a pair of oppositely disposed fixed no longitudinal tracks 26 by a pair of longitudinal slide members 28. One of the tracks 26 and one of the slide members 28 is shown in FIG. 3. Various types of mounting arrangements are known in the art for adjustably interconnecting the central seat segment 24 to the floor 19. One suitable power slide mechanism 25 is commercially available for front seat applications in vehicles sold by DaimlerChrysler Corporation, such as the 300M.

The central seat segment 24 is independently translatable between an aft position and a fore position. The aft position is shown in FIG. 2A. The fore position is shown in FIG. 2B. In the aft position, the central seat segment 24 is rearwardly positioned so as to provide sufficient space between the front and rear rows of seats to facilitate ingress and egress for rear seat occupants. In the fore position, an infant or small child positioned on the central seat segment 24 can be more easily accessed by an adult from the front rows of seats, for example when the vehicle 12 is at rest but the adults in the front rows of seats remain belted.

The power slide mechanism of the central seat segment 24 is powered by the vehicle battery 30 in a conventional manner. In the embodiment illustrated, translation of the central seat segment 24 is selectively controlled by a remotely positioned switch assembly 32. As shown, the switch assembly 32 is disposed on a console 34 located in the forward portion of the passenger compartment 14 between the driver's and passenger's seats 16 and 18. Alternatively, the switch assembly 32 can be mounted in various other positions accessible by one or both of the front seat occupants. Movement of the switch assembly 32 in a first direction operates to translate the central seat segment 24 in the fore direction A. Conversely, movement of switch assembly 32 in a second direction operates to translate the central seat segment 24 in the aft direction.

Optionally, the switch assembly 32 may include a plurality of preset seat position selectors for selectively controlling linear translation of the central seat to preset fore and aft positions. For example, it may be desirable to include a full forward position preset selector switch 35 and a full aft position preset selector switch 37. These switches would allow an operator to simply activate the full forward position preset selector switch in order to gain the most access to a child retained in the central seat, or to simply activate the full aft position preset selector switch to gain the most amount of ingress and egress to adjacent seats. Additional preset selector switches may be included to translate the central seat to desired intermediate positions. The preset selector switches may also be programmable by an operator, thus allowing the operator to quickly translate the central seat to a frequently used position 39.

In one question, the vehicle 12 includes a controller 33 for automatically translating the central seat segment 24 to the aft position in response to a predetermined vehicle condition. For example, the controller may be in operation to translate the central seat segment 24 to the aft position when the transmission is shifted out of a park mode 11. In such a manner, the central seat segment 24 would default to the rear or aft position during vehicle operation.

Figure 4:
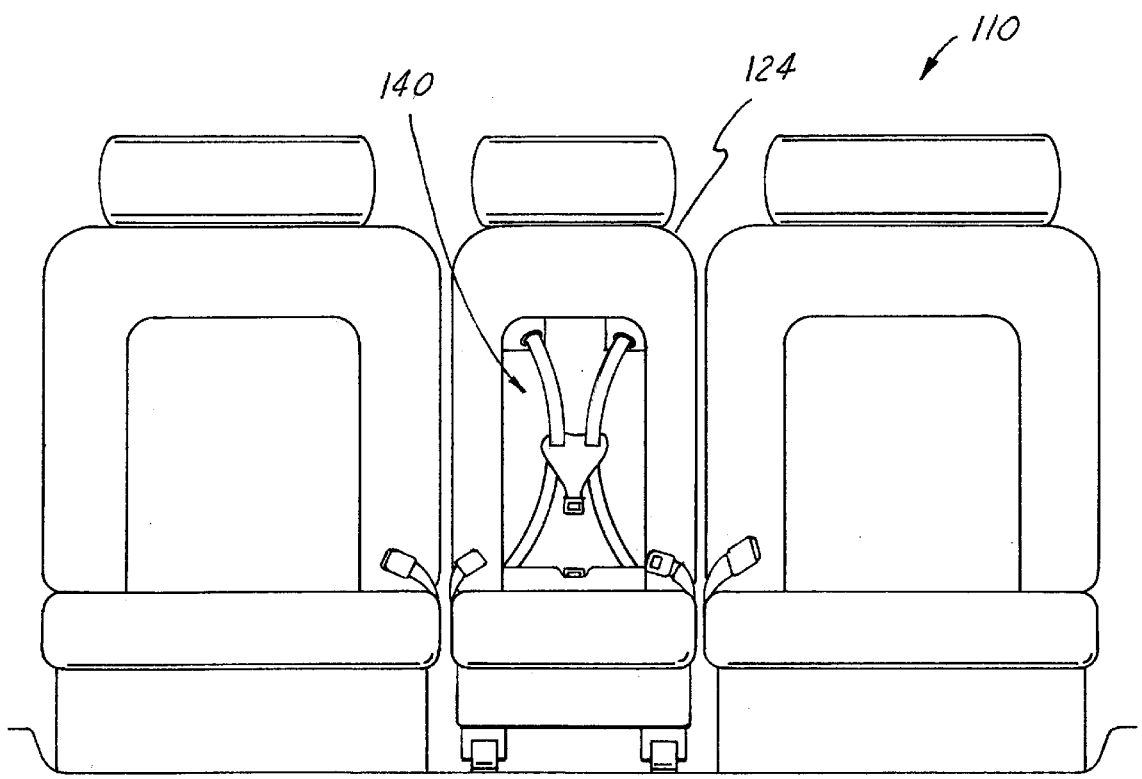
FIG. 4 is a front view of a motor vehicle incorporating a vehicle seat assembly constructed in accordance with the teachings of a second preferred embodiment of the present invention, specifically including an integrated child safety seat.

Referring now to FIG. 4, a second preferred embodiment of the seat assembly constructed in accordance with the teachings of the present invention is generally identified at 110. The second preferred embodiment includes all aspects and preferences of the first preferred embodiment except as specified herein. Specifically, the second preferred embodiment differs from the first preferred embodiment with the addition of an integrated child seat module 140. Various types of integrated child seat modules are known in the art for safely restraining a child within a motor vehicle seat 124. One suitable integrated child seat module is shown and described in commonly assigned U.S. Pat. No. 5,704,684, which is hereby incorporated by reference as if fully set forth herein. An integrated child seat module according to the present invention provides all of the advantages of a conventional integrated child seat module, namely the fact that a separate child safety seat is not necessary to safely transport a child, as well as all of the advantages of the present invention, including improved access to a child retained therein by adults located in a forward seat.

Figure 5:
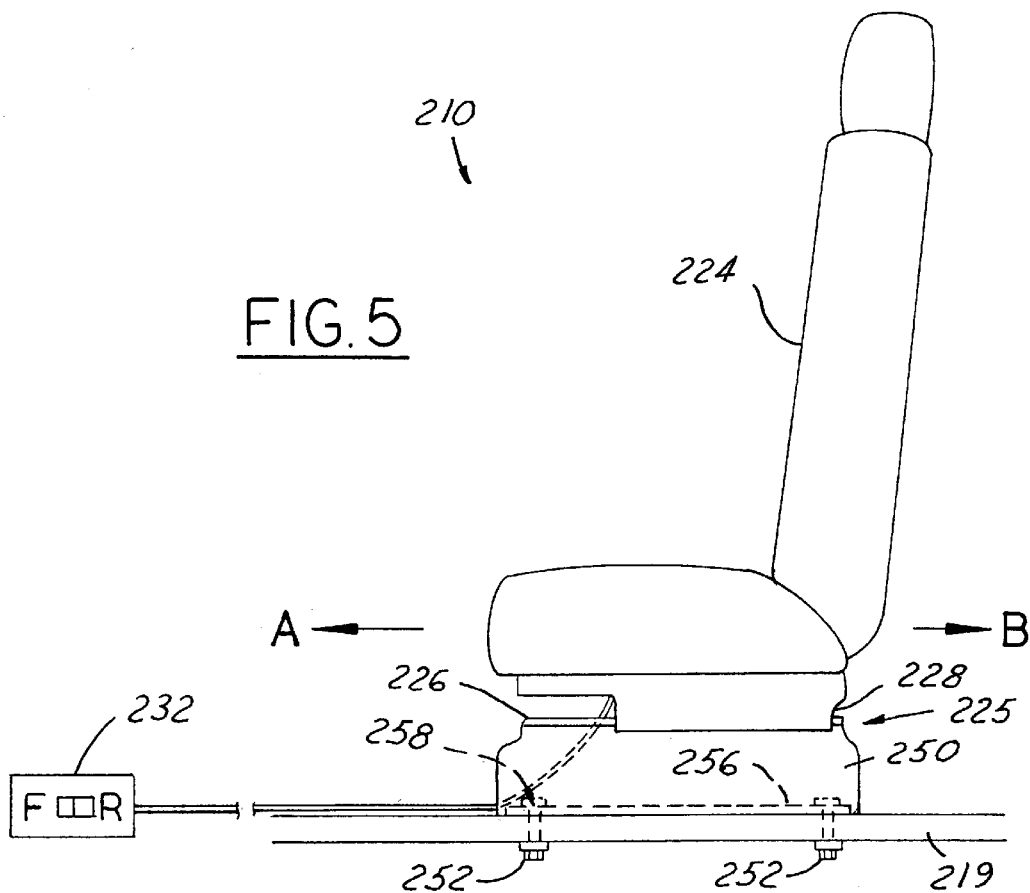
FIG. 5 is a side view of a motor vehicle assembly kit constructed in accordance with the teachings of a third preferred embodiment of the present invention, specifically showing the seat attached to the floor of a motor vehicle.

Referring now to FIG. 5, a third preferred embodiment of the seat assembly constructed in accordance with the teachings of the present invention is generally identified at 210. The third preferred embodiment includes all aspects and preferences of the first preferred embodiment except as specified herein. Specifically, the third preferred embodiment differs from the first preferred embodiment in that it includes a kit for adding a seat assembly in accordance with the present invention to a motor vehicle.

The motor vehicle seat assembly kit 210 preferably includes a stand alone central seat assembly, but may also include a complete row of seats having a translatable central seat portion. The central seat assembly is preferably installed between two existing rear seats, such as a pair of stand alone bucket seats, but may alternatively be installed in place of a right or left rear seat. The seat assembly kit generally includes a seat base 250, a plurality of attachment bolts 252 for attaching the seat base to a motor vehicle floor 219, a seat 224 translatably attached to the seat base, and a remote switch 232.

The seat base 250 has a plurality of oppositely disposed longitudinal translation tracks 226 on the upper side, and support bottom 256 on the lower side. The support bottom 256 is adapted to mount to the floor 219 of motor vehicle, and preferably includes a plurality of mounting holes 258 therethrough. A plurality of bolts 252 are adapted to thread through the mounting holes 258 and corresponding holes through the floor 219 of a motor vehicle, and to fixedly attach the seat base 250 to the motor vehicle floor 219. Although a bolting attachment method is disclosed, other conventional means for interconnecting a seat base to a vehicle floor may also be used.

The seat 224 is translatably mounted on the seat base 250 through a power slide mechanism 225 for selective movement in both a fore direction A and an aft direction B. The seat 224 is slidably mounted on the pair of oppositely disposed translation tracks 226 by a pair of slide members 228. One of the tracks 226 and one of the slide members 228 is shown in FIG. 5. Other means for adjustably interconnecting the seat 224 to a seat base 250 are known in the art and may also be used.

Once installed, the motor vehicle seat assembly kit 210 operates in the same manner as the first embodiment. Translation of the seat 224 is controlled by the remote switch assembly 232, which is preferably mounted in the front portion of the motor vehicle. The remote switch assembly 232 preferably includes a wire connecting the remote switch assembly 232 to the power slide mechanism 225, but alternatively, the remote switch assembly 232 may include a wireless remote control switch adapted to electronically communicate with the power slide mechanism. Wireless remote control switches a known in the art, and are commonly used to control a variety of functions, such as locking and unlocking doors of motor vehicles and turning car alarms on and off.

Figure 6:
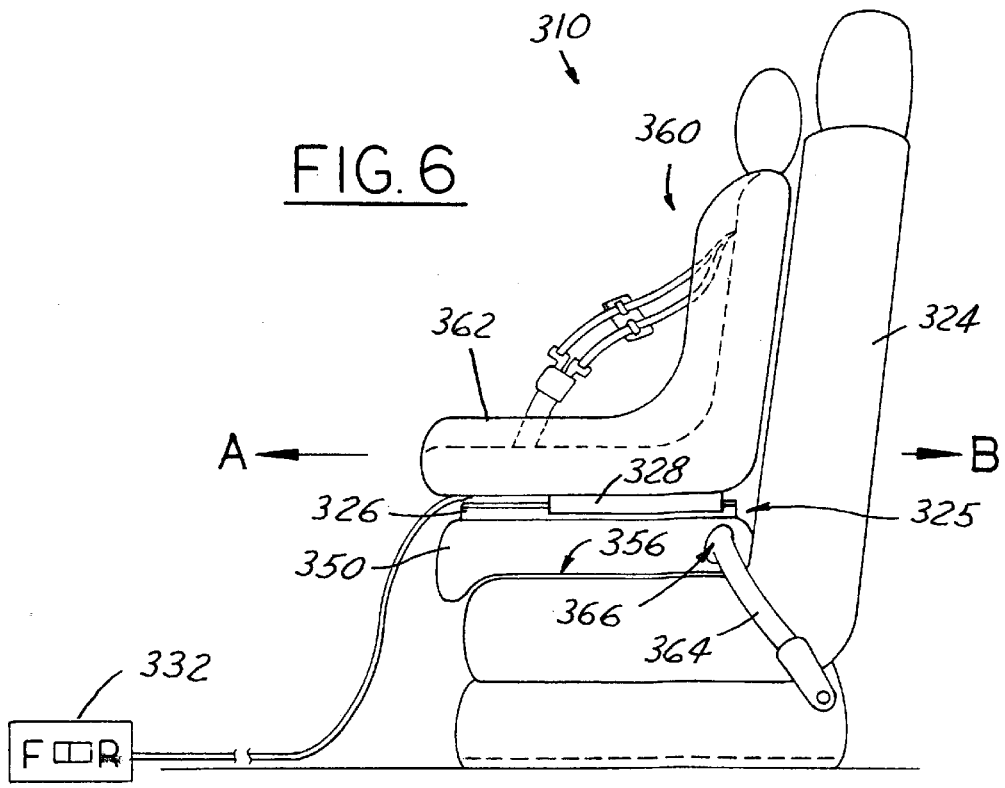
FIG. 6 is a side view of a motor vehicle incorporating a translatable child safety seat portion constructed in accordance with the teachings of a fourth preferred embodiment of the present invention.

Referring now to FIG. 6, a fourth preferred embodiment of the seat assembly constructed in accordance with the teachings of the present invention is generally identified at 310. The fourth preferred embodiment includes all aspects and preferences of the first preferred embodiment except as specified herein. Specifically, the fourth preferred embodiment differs from the first preferred embodiment in that it includes a seat assembly having a translatable child safety seat installed thereon.

The seat assembly with a translatably child safety seat 310 includes a conventional motor vehicle seat 324 having at least one seat belt, and translatable child safety seat 360. The child safety seat 360 generally includes a seat base 350, a seat portion 362 translatably attached to the seat base, and a remote switch 332.

The seat base 350 has a plurality of oppositely disposed longitudinal translation tracks 326 on the upper side, and support bottom 356 on the lower side. The support bottom 356 rests on the upper surface of motor vehicle seat 324 and is secured to motor vehicle seat 324 by a seat belt 364. The seat belt 364 is preferably threaded through a recess 366 in the seat base 350 in a conventional manner. Other conventional means for securing the child safety seat 360 to the motor vehicle seat 324 may used, and may include the use of lap belts, shoulder belts, and top tethers.

The seat portion 362 is translatably mounted on the seat base 350 through a power slide mechanism 325 for selective movement in both a fore direction A and an aft direction B. The seat portion 362 is slidably mounted on the pair of oppositely disposed translation tracks 326 by a pair of slide members 328. One of the tracks 326 and one of the slide members 328 is shown in FIG. 6. Other means for adjustably interconnecting the seat portion 362 to the seat base 350 are known in the art and may also be used.

The seat assembly with a translatable child safety seat 310 operates in the same manner as the first embodiment, except that the child seat portion 362 is the portion that translates. Translation of the seat portion 362 is controlled by the remote switch assembly 332, which is preferably mounted in the front portion of the motor vehicle. As with the third embodiment, the remote switch assembly 332 preferably includes a wire connecting the remote switch assembly 332 to the power slide mechanism 325, but alternatively, the remote switch assembly 332 may include a wireless remote control switch adapted to electronically communicate with the power slide mechanism.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed:

1. A motor vehicle comprising:

a passenger compartment including a floor;

a front row of seats disposed in a forward portion of the passenger compartment and interconnected to the floor;

at least one rear row of seats in a rear portion of the passenger compartment behind the front row of seats and interconnected to the floor, the rear row of seats including a seat assembly having at least a portion linearly translatable in a fore direction and an aft direction under a source of power; and a switch assembly located in the forward portion of the passenger compartment for selectively controlling linear translation of the portion of the seat assembly in the fore and aft directions.

2. The motor vehicle of claim 1, wherein the seat assembly is a split bench seat assembly including first and second outboard seat segments and a central seat segment, the central seat segment being linearly translatable in the fore and aft directions under the source of power.

3. The motor vehicle of claim 2, wherein the central seat segment includes an integrated child seat.

4. The motor vehicle of claim 2, wherein each of the first and second outboard seat segments includes a bucket seat.

5. The motor vehicle of claim 1, wherein the switch assembly includes a plurality of preset seat position selectors for selectively controlling linear translation of the portion of the seat assembly to preset fore and aft positions.

6. The motor vehicle of claim 5, wherein each of the plurality of preset seat position selectors are selectively programmable to correspond with an operator desired fore-aft linear position of the portion of the seat assembly.

7. The motor vehicle of claim 1, wherein the seat portion linearly translatable includes a child safety seat having a linearly translatable child seat portion.

8. The motor vehicle of claim 1, further comprising a controller for automatically translating the portion of the seat assembly to a predetermined position in response to a vehicle condition.

9. The motor vehicle of claim 8, wherein the predetermined position is an aft position.

10. The motor vehicle of claim 9, wherein the controller automatically translates the portion in response to shifting of the transmission from a park position.

* * * * *